United States Patent
Lee

(10) Patent No.: US 12,479,304 B2
(45) Date of Patent: Nov. 25, 2025

(54) RELAY ASSEMBLY AND ELECTRIC VEHICLE COMPRISING SAME

(71) Applicant: LG ENERGY SOLUTION, LTD., Seoul (KR)

(72) Inventor: Sang Rae Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/266,020

(22) PCT Filed: Sep. 26, 2022

(86) PCT No.: PCT/KR2022/014355
§ 371 (c)(1),
(2) Date: Jun. 8, 2023

(87) PCT Pub. No.: WO2023/068579
PCT Pub. Date: Apr. 27, 2023

(65) Prior Publication Data
US 2024/0034152 A1     Feb. 1, 2024

(30) Foreign Application Priority Data
Oct. 22, 2021   (KR) .......................... 10-2021-0142030

(51) Int. Cl.
*B60L 3/04*     (2006.01)
*B60L 50/51*    (2019.01)
*H01H 50/54*    (2006.01)

(52) U.S. Cl.
CPC ................. *B60L 3/04* (2013.01); *B60L 50/51* (2019.02); *H01H 50/54* (2013.01); *B60L 2240/547* (2013.01)

(58) Field of Classification Search
CPC ....... B60L 3/04; B60L 50/51; B60L 2240/547; H01H 50/54
(Continued)

(56) References Cited
U.S. PATENT DOCUMENTS 8,390,410 B2    3/2013  Kojima et al.
2016/0027602 A1  1/2016  Hasegawa et al.
(Continued)

FOREIGN PATENT DOCUMENTS

JP    63-69112 A    3/1988
JP    2003-22739 A  1/2003
(Continued)

OTHER PUBLICATIONS

International Search Report (PCT/ISA/210) issued in PCT/KR2022/014355 mailed on Jan. 4, 2023.
(Continued)

*Primary Examiner* — Jorge L Carrasquillo
(74) *Attorney, Agent, or Firm* — Birch, Stewart, Kolasch & Birch, LLP

(57) ABSTRACT

There are disclosed a relay assembly for connecting an inverter of a device driven by a battery as a power source to the battery and an electric vehicle having the relay assembly, the relay assembly including a switching unit connecting or disconnecting the battery and the inverter and an electromagnet unit installed to operate the switching unit, the switching unit including a plurality of contacts rotated by magnetic force of the electromagnet unit and controlled to be connected and disconnected with a degree of rotation. With the relay assembly and the electric vehicle having the same, it is possible to simplify the installation structure and reduce the installation space.

15 Claims, 4 Drawing Sheets

310 : 311, 312, 313, 314
315, 316, 317

(58) Field of Classification Search
USPC .......................................................... 318/139
See application file for complete search history.

(56) References Cited

U.S. PATENT DOCUMENTS

| | | | |
|---|---|---|---|
| 2018/0043783 A1* | 2/2018 | Tabatowski-Bush | B60L 1/00 |
| 2019/0173292 A1* | 6/2019 | Kim | B60L 53/30 |
| 2019/0229377 A1 | 7/2019 | Kim | |
| 2020/0273649 A1* | 8/2020 | Kong | H01M 10/44 |
| 2021/0184455 A9* | 6/2021 | Fisher | H02H 3/087 |
| 2021/0234383 A1 | 7/2021 | Lee et al. | |
| 2022/0044896 A1 | 2/2022 | Friedrichsen et al. | |

FOREIGN PATENT DOCUMENTS

| | | |
|---|---|---|
| JP | 2005-183097 A | 7/2005 |
| JP | 2006-309997 A | 11/2006 |
| JP | 2007-294425 A | 11/2007 |
| JP | 2015-35318 A | 2/2015 |
| JP | 2020-129489 A | 8/2020 |
| KR | 10-0792930 B1 | 1/2008 |
| KR | 10-2013-0034812 A | 4/2013 |
| KR | 10-1294353 B1 | 8/2013 |
| KR | 10-2016-0066762 A | 6/2016 |
| KR | 10-2019-0064844 A | 6/2019 |
| KR | 10-2020-0081368 A | 7/2020 |
| KR | 10-2237376 B1 | 4/2021 |
| KR | 10-2021-0102910 A | 8/2021 |
| WO | WO 2020/096387 A1 | 5/2020 |

OTHER PUBLICATIONS

Extended European Search Report for European Application No. 22883803.3, dated Jun. 26, 2024.

* cited by examiner

RELAY ASSEMBLY AND ELECTRIC VEHICLE COMPRISING SAME

CROSS REFERENCE TO RELATED APPLICATIONS

This application is the National Phase of PCT/KR2022/014355 filed on Sep. 26, 2022, which claims priority under 35 U.S.C. § 119 (a) to Patent Application No. 10-2021-0142030 filed in the Republic of Korea on Oct. 22, 2021, all of which are hereby expressly incorporated by reference into the present application.

TECHNICAL FIELD

The present disclosure to a relay assembly and an electric vehicle having the same, and more particularly, to a relay assembly capable of simplifying an installation structure and reducing an installation space, and an electric vehicle having the same.

BACKGROUND ART

An electric vehicle is a vehicle that travels by driving a motor using electric power stored in a battery as a power source. The electric vehicle is provided with a power relay for supplying and cutting off electric power of the battery to a motor.

Meanwhile, the battery used in the electric vehicle is mainly a medium-to-large battery pack of high output and large capacity. Accordingly, when electric power is supplied from the battery pack to the motor at the time of starting the electric vehicle, a high voltage inrush current may be instantaneously conducted, and damage such as fusion of the power relay may occur due to the inrush current.

Therefore, in the related art, in order to prevent damage to the power relay due to inrush current, a pre-charge relay is additionally provided and connected in parallel with the power relay, where the pre-charge relay first conducts electric power from the battery pack to the motor, and then the power relay sequentially conducts electric power from the battery pack to the motor.

Thereby, the electric vehicle in the related art requires additional members for mechanical fastening and electrical connection of the pre-charge relay, and there is a problem in that the installation structure is complicated due to the members. In addition, for some reasons, such as having to secure an installation space for the members within the limited internal space of the electric vehicle, there is a problem of space loss.

The technology underlying the present disclosure is disclosed in the following patent documents.

Patent Document (Patent Document 1) KR10-2013-0034812 A
(Patent Document 2) KR10-2019-0064844 A

DISCLOSURE OF THE INVENTION

Technical Problem

The present disclosure provides a relay assembly capable of simplifying an installation structure and reducing an installation space, and an electric vehicle having the same.

Technical Solution

According to an exemplary embodiment of the present disclosure, there is provided a relay assembly for connecting an inverter of a device driven by a battery as a power source to the battery, including: a switching unit connecting or disconnecting the battery and the inverter, the switching unit including a plurality of contacts rotated by magnetic force of the electromagnet unit and controlled to be connected and disconnected with a degree of rotation; and an electromagnet unit installed to operate the switching unit.

The switching unit may include: a battery connection terminal connected to the battery; an inverter connection terminal connected to the inverter; a lever extending in a first direction from a tip of the battery connection terminal; a main contact bar connected to a tip of the lever and extending obliquely in a second direction intersecting the first direction; a pre-charge contact bar connected apart from the tip of the lever, extending obliquely in the second direction, and including a contact resistor; and a contact bar extending from a tip of the inverter connection terminal to come into contact with the main contact bar and the pre-charge contact bar, and disposed to face the lever.

The electromagnet unit may extend in another direction, and may be disposed in an order of the electromagnet unit, the main contact bar, and the pre-charge contact bar in one direction.

At least a portion of each of the main contact bar and the pre-charge contact bar may include a magnetic member, the electromagnet unit may include a coil for forming a same polarity as that of the magnetic member in a direction toward the main contact bar and the pre-charge contact bar, and a first end of each of the main contact bar and the pre-charge contact bar may be rotatably connected to the lever so that a second end opposite to the first end connected to the lever is rotated in one direction around the one end connected to the lever by a repulsive force applied from the electromagnet unit to come into contact with contact bar.

The switching unit may further include a spacer containing a non-conductive material and disposed between the main contact bar and the pre-charge contact bar to maintain an interval between the main contact bar and the pre-charge contact bar.

The contact bar may include: a first member having an upper end connected to the inverter connection terminal, and extending in the first direction; a second member extending in a third direction from a lower end of the first member so that one end of the second member comes into contact with the pre-charge contact bar; and a third member extending in the first direction from the second member so that one side of the third members comes into contact with the pre-charge contact bar and a lower end of the third member comes into contact with the main contact bar.

An extension length of the main contact bar in the second direction may be longer than a separation distance between the lever and the one side of the third member, and shorter than a separation distance between the lever and another side of the third member.

An extension length of the pre-charge contact bar in the second direction may be equal to a separation distance between the lever and the one side of the third member.

According to an exemplary embodiment of the present disclosure, there is provided an electric vehicle including: a battery; an inverter for supplying electric power from the battery to an electric motor; and the relay assembly for supplying and cutting off electric power from the battery to the inverter.

Advantageous Effects

According to an exemplary embodiment of the present disclosure, it is possible to sequentially apply a pre-charge voltage and a main voltage from the battery to the inverter by the relay assembly using the switching unit including a plurality of contacts rotated in conjunction by the magnetic force and controlled to be connected and disconnected with the degree of rotation.

In this way, it is possible to omit the pre-charge relay in the related art and members for mechanical fastening and electrical connection thereof. Accordingly, it is possible to simplify the installation structure of the relay assembly, and reduce the size of a space in which the relay assembly is installed.

MODE FOR CARRYING OUT THE INVENTION

Figure 1:
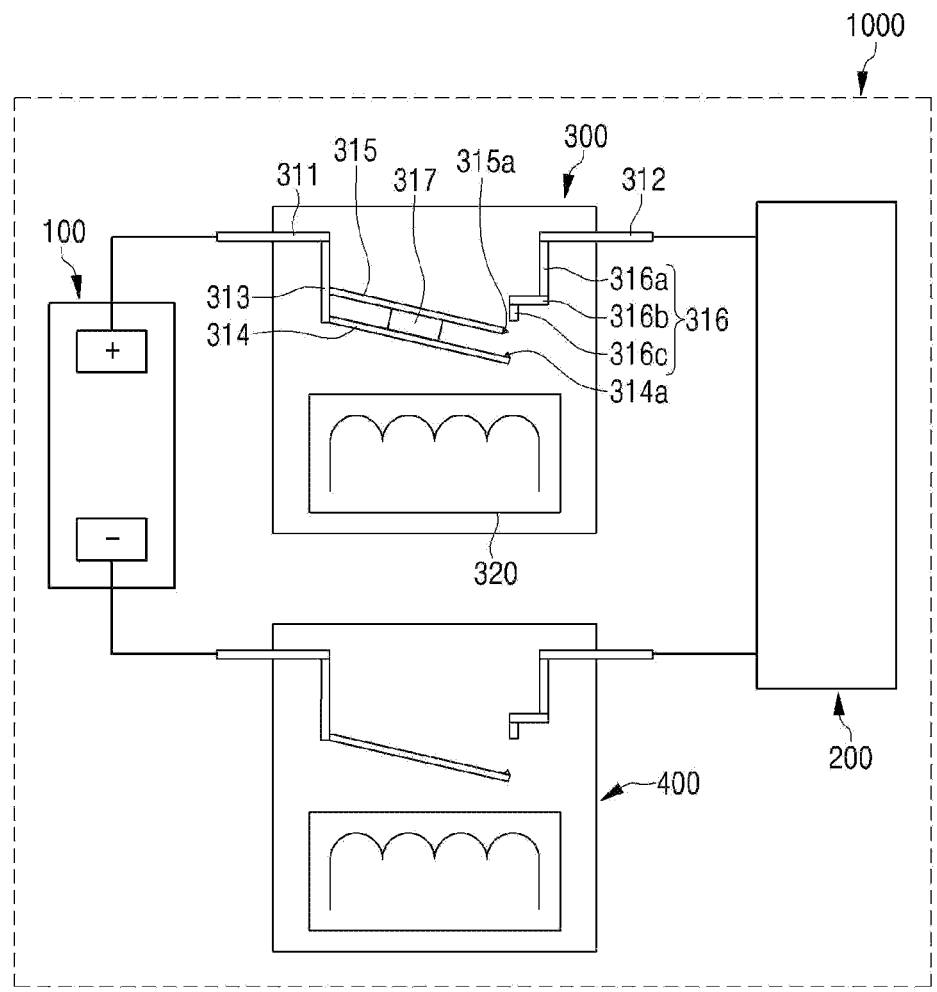
FIG. 1 is a schematic diagram of an electric vehicle and a relay assembly according to an exemplary embodiment of the present disclosure.

Hereinafter, exemplary embodiments of the present disclosure will be described in detail with reference to the accompanying drawings. However, the present disclosure is not limited to the exemplary embodiments disclosed below, and will be implemented in various different forms. The exemplary embodiments are merely provided so that the present disclosure is complete, and fully inform those of ordinary skill in the art of the scope of the disclosure. In order to describe the exemplary embodiments of the present disclosure, the drawings may be exaggerated, parts irrelevant to the description may be omitted from the drawings, and the same reference numerals in the drawings refer to the same elements.

Hereinafter, exemplary embodiments of the present disclosure will be described with reference to the drawings.

1. Electric Vehicle According to Exemplary Embodiment of Present Disclosure

FIG. 1 is a schematic diagram of an electric vehicle and a relay assembly according to an exemplary embodiment of the present disclosure. FIGS. 2 to 5 are operational diagrams of a relay assembly according to an exemplary embodiment of the present disclosure.

An electric vehicle 1000 according to an exemplary embodiment of the present disclosure includes a battery 100, an inverter 200 for supplying electric power of the battery 100 to an electric motor (not shown), and a relay assembly 300 according to an exemplary embodiment of the present disclosure for supplying or cutting off electric power from the battery 100 to the inverter 200. In this case, the relay assembly 300 may connect the positive terminal of the battery 100 and the inverter 200.

Meanwhile, the electric vehicle 1000 according to an exemplary embodiment of the present disclosure may further include a main relay 400 for connecting the negative terminal of the battery 100 and the inverter 200.

1.1. Battery (100)

The battery 100 serves to store electric power used as a power source of the electric vehicle. The battery 100 may include a plurality of battery cells capable of being charged and discharged. In this case, the plurality of battery cells may include a plurality of secondary battery cells. In addition, the plurality of battery cells may be provided in the form of a battery pack. The battery pack may be provided with a battery management system (BMS).

1.2. Inverter (200)

The inverter 200 may convert the direct current of the battery 100 into an alternating current and supply it to the electric motor. In addition, the inverter 200 may control the frequency and voltage of the alternating current to adjust output of the electric motor. In this case, the output may refer to the number of rotations and torque.

1.3. Relay Assembly (300)

The relay assembly 300 serves as an electric power supply path to connect or disconnect the battery 100 and the inverter 200. The relay assembly 300 may be installed to connect the positive terminal of the battery 100 and the inverter 200. The relay assembly 300 may sequentially apply a pre-charge voltage and a main voltage from the battery 100 to the inverter 200 by using the switching unit 310 including a plurality of contacts rotated by the magnetic force and controlled to be connected and disconnected with the degree of rotation. Meanwhile, the relay assembly 300 is mounted on a circuit board (not shown) and may be protected by a housing (not shown).

1.4. Main Relay (400)

The main relay 400 may be installed to connect the negative terminal of the battery 100 and the inverter 200. The configuration and method of the main relay 400 may vary.

2. Relay Assembly According to Exemplary Embodiment of Present Disclosure

Hereinafter, the relay assembly 300 according to an exemplary embodiment of the present disclosure will be described in detail. In this case, hereinafter, the exemplary embodiment of the present disclosure will be described in detail by exemplifying a case in which the relay assembly 300 is applied to an electric vehicle. Of course, the relay assembly 300 according to the exemplary embodiment of the present disclosure may be applied to various devices driven by a battery as a power source, and may be used to connect an inverter of the device and a battery.

Referring to FIG. 1, in order to connect and disconnect the battery 100 and the inverter 200, the relay assembly 300 according to the exemplary embodiment of the present disclosure includes the switching unit 310 including a plurality of contacts rotated by the magnetic force of an electromagnet unit and controlled to be connected and disconnected with the degree of rotation, and an electromagnet unit 320 installed to operate the switching unit 310.

2.1. Switching Unit (310)

The switching unit 310 may include a battery connection terminal 311, an inverter connection terminal 312, a lever 313, a main contact bar 314, a pre-charge contact bar 315, a contact bar 316, and a spacer 317. Here, the battery connection terminal 311, the inverter connection terminal 312, the lever 313, the main contact bar 314, the pre-charge contact bar 315, and the contact bar 316 may contain an electrically conductive material. Among them, at least a portion of each of the main contact bar 314 and the pre-charge contact bar 315 may include a magnetic member. In this case, the magnetic member may have the same polarity as that of the magnetic force generated by the electromagnet unit 320. Meanwhile, the spacer 317 may contain a non-conductive material.

The switching unit 310 may include first and second electric power supply paths. The first electric power supply path may be formed by connecting the battery connection terminal 311, the inverter connection terminal 312, the lever 313, the pre-charge contact bar 315, and the contact bar 316. Furthermore, the second electric power supply path may be formed by connecting the battery connection terminal 311, the inverter connection terminal 312, the lever 313, the main contact bar 314, and the contact bar 316. The switching unit 310 may separate the main contact bar 314 and the pre-charge contact bar 315 from the contact bar 316, thereby blocking the first and second electric power supply paths. That is, the switching unit 310 may operate to form the first electric power supply path, form the second electric power supply path, or block the both power supply paths. Here, the operation of the switching unit 310 may be controlled by the electromagnet unit 320.

2.1.1. Battery Connection Terminal (311)

One end of the battery connection terminal 311 may be connected to the positive terminal of the battery 100. The other end opposite to the one end of the battery connection terminal 311 may extend toward the inverter connection terminal 312. The lever 313 may be connected to the other end of the battery connection terminal 311.

2.1.2. Inverter Connection Terminal (312)

One end of the inverter connection terminal 312 may be spaced apart from the other end of the battery connection terminal 311 while facing each other. The other end of the inverter connection terminal 312 may be connected to the inverter 200.

2.1.3. Lever (313)

The lever 313 may extend in one direction from the tip of the battery connection terminal 311. Here, the tip of the battery connection terminal 311 may be referred to as the other end of the battery connection terminal 311. One direction may be a direction intersecting a direction in which the battery connection terminal 311 extends. For example, the battery connection terminal 311 may extend in a right-left direction. In this case, one direction may be a front-back direction or an up-down direction. Hereinafter, the exemplary embodiment of the present disclosure will be described on the basis that one direction is an up-down direction. Of course, the direction in which the battery connection terminal 311 extends may be varied, and thus one direction may also be varied. Meanwhile, the direction in which the battery connection terminal 311 extends may be referred to as the other direction.

The lever 313 may have an upper end connected to the other end of the connection terminal 311, and a lower end being spaced apart from the electromagnet unit 320 while facing each other in the up-down direction.

2.1.4. Main Contact Bar (314)

One end of the main contact bar 314 may be connected to the tip of the lever 313, and may extend obliquely in the other direction. Here, the tip of the lever 313 may be the lower end of the lever 313. At the other end opposite to the one end of the main contact bar 314, a main contact 314a protruding upward may be formed. The length of the main contact bar 314 extending obliquely in the other direction may be longer than a separation distance between the lever 313 and one side of a third member 316c of the contact bar 316 to be described later, and may be shorter than a separation distance between the lever 313 and the other side of the above-mentioned third member 316c.

The main contact bar 314 may have one end rotatably connected to the lever 313 so that the other end is rotated in one direction around the one end connected to the lever 313 by the repulsive force applied from the electromagnet unit 320 to come into contact with the contact bar 316. Of course, the main contact bar 314 may be formed of a material having elasticity to be connected to the contact bar 316 while being deformed through bending by the elasticity and to be spaced apart from the contact bar 316 through elastic restoration.

The height of the other end of the main contact bar 314 may be different depending on whether it is rotated. In this case, as described above, rotation may mean that the other end opposite to one end of the main contact bar 314 is rotated in one direction around one end of the main contact bar 314.

Figure 2:
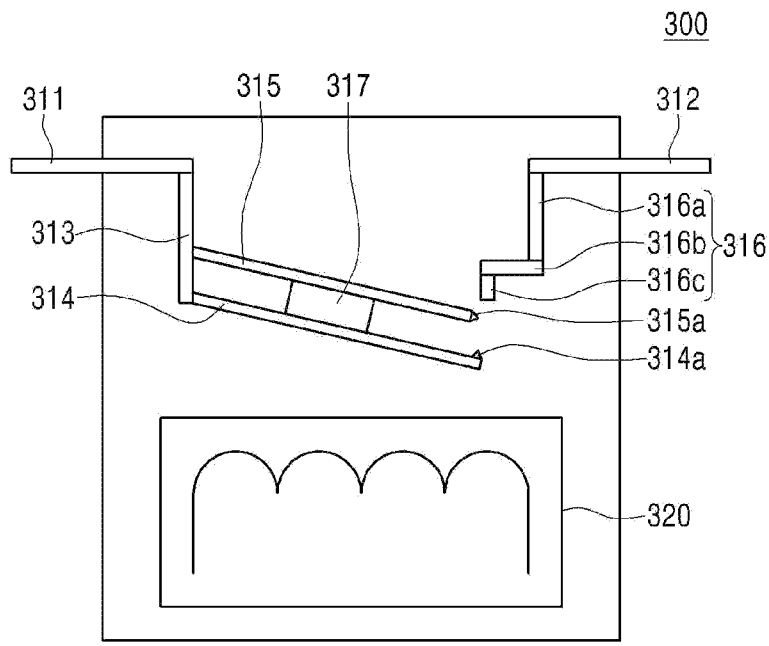
FIGS. 2 to 5 are operational diagrams of a relay assembly according to an exemplary embodiment of the present disclosure.

The other end of the main contact bar 314 may be spaced apart by a first height from the lower end of the contact bar 316 in an initial state in which the main contact bar 314 is not rotated (see FIG. 2). In addition, the other end of the main contact bar 314 may rise to a second height higher than the first height in a first rotation state in which the main contact bar 314 is rotated by a first angle, and may be spaced apart from the lower end of the contact bar 316 (see FIG. 3). In addition, the other end of the main contact bar 314 may rise to a third height higher than the second height in a second rotation state in which the main contact bar 314 is rotated by a second angle smaller than the first angle and may come into contact with the lower end of the contact bar 316 (see FIG. 4). The third height may be the height of the lower end of the contact bar 316. In addition, the other end of the main contact bar 314 may rise to a fourth height higher than the third height in a third rotation state in which the main contact bar 314 is rotated by a third angle smaller than the second angle. The fourth height may be a contracted height of the lower end of the contact bar 316, and the other end of the main contact bar 314 may maintain the contact with the lower end of the contact bar 316 (see FIG. 5). That is, when the main contact bar 314 is rotated by the third angle, the lower end of the contact bar 316 may be contracted upward, thereby preventing damage to the main contact bar 314 and the contact bar 316.

Of course, damage to the main contact bar 314 and the contact bar 316 may be prevented by bending the main contact bar 314 between one end and the other end thereof, instead of the lower end of the contact bar 316 being contracted.

Here, the above-described first height, second height, third height, and fourth height may be predetermined heights based on the lower end of the contact bar 316. In addition, the first angle, the second angle, and the third angle may be predetermined angles between the lever 313 and the upper side of the main contact bar 314. Meanwhile, the rotation of the main contact bar 314 may be performed by the electromagnet unit 320.

2.1.5. Pre-Charge Contact Bar (315)

The pre-charge contact bar 315 may include a contact resistor, for example, a pre-charge resistor. The contact resistor serves to prevent fusion of the pre-charge contact bar 315 due to inrush current when the pre-charge contact bar 315 contacts the contact bar 316.

The pre-charge contact bar 315 may have one end spaced apart from the lower end of the lever 313 by a predetermined height, and may be connected to the lever 313 between the upper end and the lower end of the lever 313. The pre-charge contact bar 315 may be disposed to be parallel to the main contact bar 314 by extending obliquely in the other direction. At the other end of the pre-charge contact bar 315, a pre-charge contact 315a may protrude in a direction in which the pre-charge contact bar 315 extends. The length of the pre-charge contact bar 315 extending obliquely in the other direction may be the same as the separation distance between the lever 313 and one side of the third member 316c described above.

The pre-charge contact bar 315 may have one end rotatably connected to the lever 313 so that the other end is rotated in one direction around the one end connected to the lever 313 by the repulsive force applied from the electromagnet unit 320 to come into contact with the contact bar 316. Of course, the pre-charge contact bar 315 may be formed of a material having elasticity to be connected to the contact bar 316 while being deformed through bending by the elasticity and to be spaced apart from the contact bar 316 through elastic restoration.

The height of the other end of the pre-charge contact bar 315 may be different depending on whether it is rotated. The other end of the pre-charge contact bar 315 may be spaced apart by a fifth height from the lower end of the contact bar 316 in an initial state in which the pre-charge contact bar 315 is not rotated (see FIG. 2). In addition, the other end of the pre-charge contact bar 315 may rise to a sixth height higher than the above-mentioned fifth height in a fourth rotation state in which the pre-charge contact bar 315 is rotated by a fourth angle and may come into contact with the contact bar 316 (see FIG. 3). In addition, the other end of the pre-charge contact bar 315 may rise to a seventh height higher than the sixth height in a fifth rotation state in which the pre-charge contact bar 315 is rotated by a fifth angle smaller than the fourth angle and may maintain the contact with the contact bar 316 (see FIG. 4). In addition, the other end of the pre-charge contact bar 315 may rise to an eighth height higher than the seventh height in a sixth rotation state in which the pre-charge contact bar 315 is rotated by a sixth angle smaller than the fifth angle and may be released from the contact with the contact bar 316 (see FIG. 5).

Here, the fifth height, the sixth height, the seventh height, and the eighth height may be predetermined heights based on the lower end of the contact bar 316. Among them, the fifth height may be lower than the lower end of the contact bar 316. In addition, the sixth height, the seventh height, and the eighth height may be higher than the lower end of the contact bar 316. Furthermore, the fourth angle, the fifth angle, and the sixth angle may be predetermined angles between the lever 313 and the upper side of the pre-charge contact bar 315. In this case, the fourth angle may be the same as the above-described first angle, the fifth angle may be the same as the above-described second angle, and the sixth angle may be the same as the above-described third angle.

Meanwhile, the rotation of the pre-charge contact bar 315 may be performed by the electromagnet unit 320.

2.1.6. Contact Bar (316)

The contact bar 316 may extend in one direction from a tip, for example, one end of the inverter connection terminal 312 to come into contact with the main contact bar 314 and the pre-charge contact bar 315, and may be disposed to face the lever 313. The contact bar 316 may contact and be spaced apart from the main contact bar 314 and the pre-charge contact bar 315 with the rotation angle of the main contact bar 314 and the pre-charge contact bar 315.

The structure of the contact bar 316 may vary. The contact bar 316 may include, for example, a first member 316a having an upper end connected to the inverter connection terminal 312, and extending in one direction, a second member 316b extending in another direction from a lower end of the first member 316a so that one end thereof is to come into contact with the pre-charge contact bar 315, and a third member 316c extending in one direction from the second member 316b so that one side thereof is to come into contact with the pre-charge contact bar 315 and a lower end thereof is to come into contact with the main contact bar 314. Here, the height of the upper side of the second member 316b may be the same as the height of one end of the pre-charge contact bar 315 within the margin of error.

The main contact 314a and the pre-charge contact 315a of the main contact bar 314 and the pre-charge contact bar 315 come into contact with a contact portion such as the third member of the contact bar 316 to form a current path.

2.1.7. Spacer (317)

The spacer 317 may contain a non-conductive material. The spacer 317 serves to space the main contact bar 314 and the pre-charge contact bar 315 apart. More specifically, the spacer 317 may be disposed between the main contact bar 314 and the pre-charge contact bar 315 to maintain a distance between the main contact bar 314 and the pre-charge contact bar 315 in one direction. The spacer 317 allows the main contact bar 314 and the pre-charge contact bar 315 to be rotated at the same angle.

2.2. Electromagnet Unit (320)

The electromagnet unit 320 may be disposed below the main contact bar 314, and may face the main contact bar 314 in the up-down direction. Accordingly, the electromagnet unit 320, the main contact bar 314, and the pre-charge contact bar 315 may be disposed in this order from the lower side to the upper side.

The electromagnet unit 320 may generate magnetic force by receiving current from the BMS (not shown) of the battery 100 or the integrated power control device (not shown) of the electric vehicle. In this case, the magnetic force generated by the electromagnet unit 320 may have the same polarity as the polarity of a magnetic member included in each of the main contact bar 314 and the pre-charge contact bar 315. To this end, the electromagnet unit 320 may include a coil for forming the same polarity as that of the above-described magnetic members in a direction toward the main contact bar 314 and the pre-charge contact bar 315.

When current is supplied to the electromagnet unit 320 and magnetic force is generated, a repulsive force may be formed between the electromagnet unit 320 and the main contact bar 314 and the pre-charge contact bar 315 by the magnetic force generated by the electromagnet unit 320. By the repulsive force, the other end of each of the main contact bar 314 and the pre-charge contact bar 315 may be rotated in one direction around one end of each of the main contact bar 314 and the pre-charge contact bar 315. In this case, the electromagnet unit 320 may extend in another direction in order to effectively apply the magnetic force to the main contact bar 314 and the pre-charge contact bar 315.

3. Operations of Electric Vehicle and Relay Assembly According to Exemplary Embodiment of Present Disclosure Hereinafter, operations of the electric vehicle and the relay assembly according to an exemplary embodiment of the present disclosure will be described with reference to FIGS. 1 to 5.

The electric vehicle electrically connects the battery 100 and the inverter 200 by operating the relay assembly 300 for driving. In this case, the main relay 400 first operates to connect the negative terminal of the battery 100 and the inverter 200. Then, the relay assembly 300 operates to connect the positive terminal of the battery 100 and the inverter 200.

In this case, the relay assembly 300 connects the battery connection terminal 311, the inverter connection terminal 312, the lever 313, and the pre-charge contact 315a of the pre-charge contact bar 315, and the contact bar 316 to form a first electric power path so that the relay assembly 300 is not damaged due to inrush current, and first applies the pre-charge voltage from the battery 100 to the inverter 200 by using the first electric power path.

Figure 3:
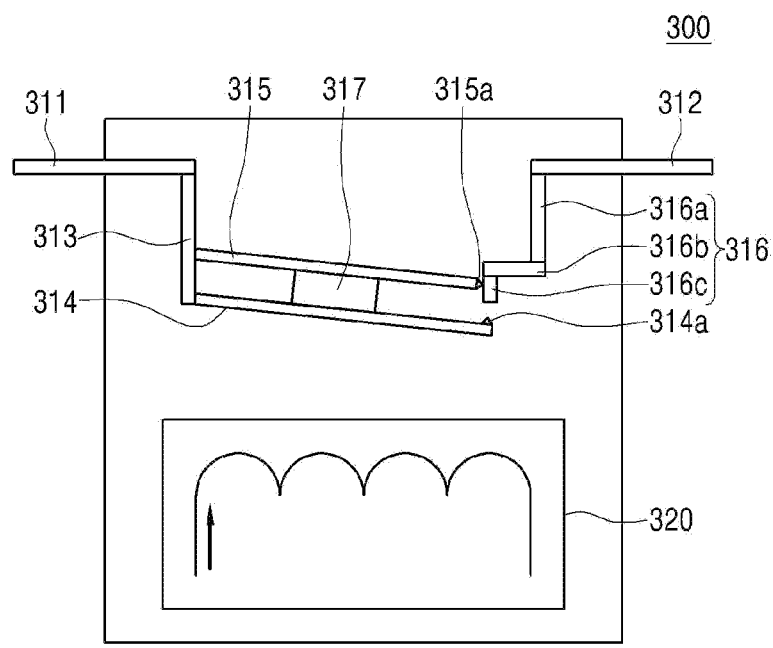

Specifically, referring to FIG. 3, a repulsive force for rotating the main contact bar 314 and the pre-charge contact bar 315 is generated by applying a first current to the electromagnet unit 320. Due to the repulsive force, the main contact bar 314 and the pre-charge contact bar 315 may be rotated at first and fourth angles, and the other end of the pre-charge contact bar 315 may rise to the second height by the rotation and may come into contact with the contact bar 316. At this time, the other end of the main contact bar 314 rises to the sixth height, and may be spaced apart from the contact bar 316.

In this way, through the battery connection terminal 311, the inverter connection terminal 312, the lever 313, the pre-charge contact bar 315, and the contact bar 316, the pre-charge voltage may be supplied from the battery 100 to the inverter 200. At this time, a predetermined current may be charged in the capacitor of the inverter 200.

After the pre-charge voltage is supplied from the battery 100 to the inverter 200 for a predetermined time, the relay assembly 300 may connect the battery connection terminal 311, the inverter connection terminal 312, the lever 313, the main contact 314a of the main contact bar 314, and the contact bar 316 to form a second electric power path, and may sequentially apply the main voltage from the battery 100 to the inverter 200 by using the second electric power path.

Figure 4:
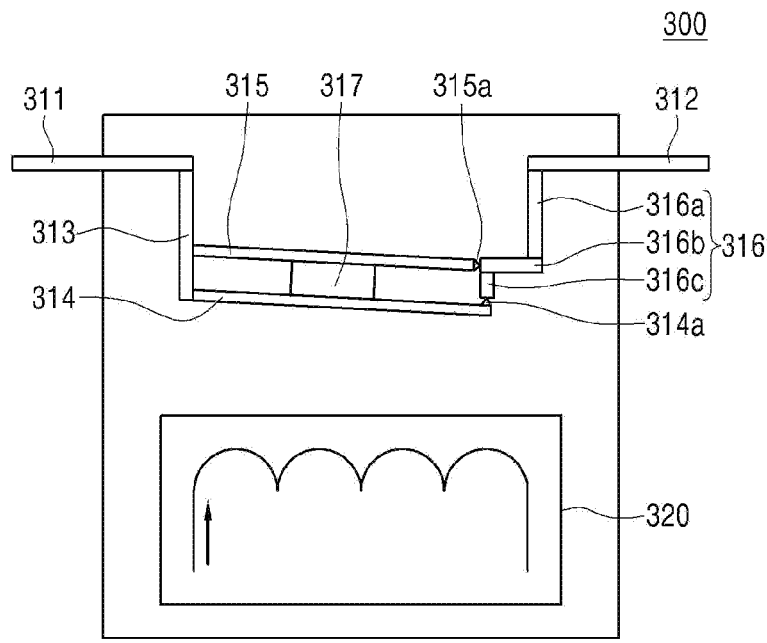

Specifically, referring to FIG. 4, the magnitude of the repulsive force for rotating the main contact bar 314 and the pre-charge contact bar 315 is increased by applying a second current larger than the first current to the electromagnet unit 320. Due to the increased repulsive force, the main contact bar 314 and the pre-charge contact bar 315 may be rotated at the second and fifth angles, and the other end of the pre-charge contact bar 315 may rise to the third height by the rotation and the other end of the main contact bar 314 may rise to the seventh height. In this way, the other end of the pre-charge contact bar 315 may maintain the contact with the contact bar 316, and the other end of the main contact bar 314 may come into contact with the contact bar 316.

In this way, through the battery connection terminal 311, the inverter connection terminal 312, the lever 313, the main contact bar 314, and the contact bar 316, the main voltage may be supplied from the battery 100 to the inverter 200.

When the supply of the main voltage is started, the pre-charge contact bar 315 may be spaced apart from the contact bar 316.

Figure 5:
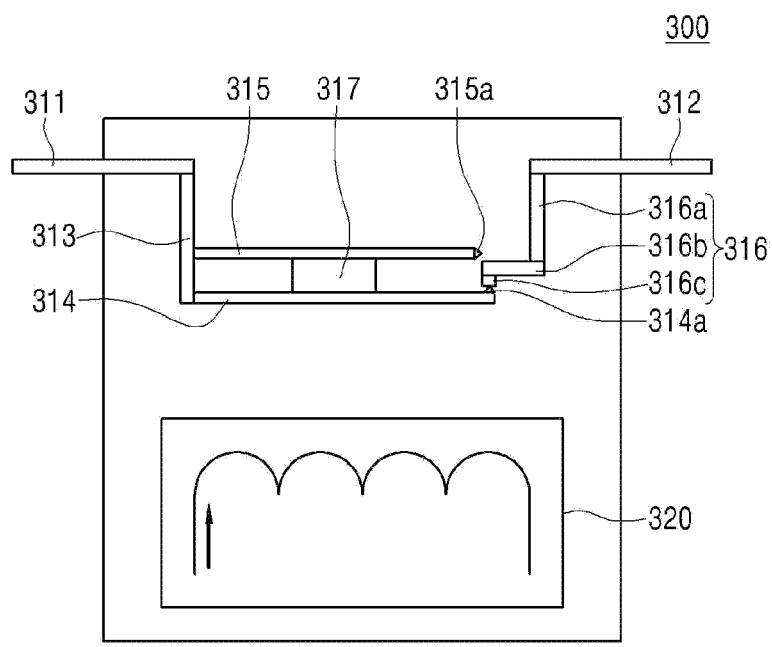

Specifically, referring to FIG. 5, the magnitude of the repulsive force for rotating the main contact bar 314 and the pre-charge contact bar 315 is further increased by applying a third current larger than the second current to the electromagnet unit 320. Due to the further increased repulsive force, the main contact bar 314 and the pre-charge contact bar 315 may be rotated at the third and sixth angles, and the other end of the pre-charge contact bar 315 may rise to the fourth height by the rotation and the other end of the main contact bar 314 may rise to the eighth height. In this way, the other end of the pre-charge contact bar 315 may be separated from the contact bar 316, and the other end of the main contact bar 314 may maintain the contact with the contact bar 316. In this way, in order to prevent damage to the other end of the main contact bar 314, the lower end of the third member 316 of the contact bar 316 may contract upward as much as the other end of the main contact bar 314 rises.

Then, the main voltage is supplied from the battery 100 to the inverter 200, and the electric motor connected to the inverter 200 is operated, which makes it possible for the electric vehicle to be stably driven.

That is, in the relay forming the switching unit of the present disclosure, according to the operation of the electromagnet, control is executed such that the pre-charge contact 315a connected to the resistor is first connected to the contact of the contact bar 316, and next, the pre-charge contact 315a and the main contact 314a is simultaneously connected to the contact of the contact bar 316, and after that, the pre-charge contact 315a is separated and only the main contact 314a is connected.

4. Contrast of Electric Vehicle and Relay Assembly According to Comparative Example and Exemplary Embodiment of Present Disclosure FIG. 6 is a schematic diagram of an electric vehicle and a relay assembly according to a comparative example of the present disclosure.

Figure 6:
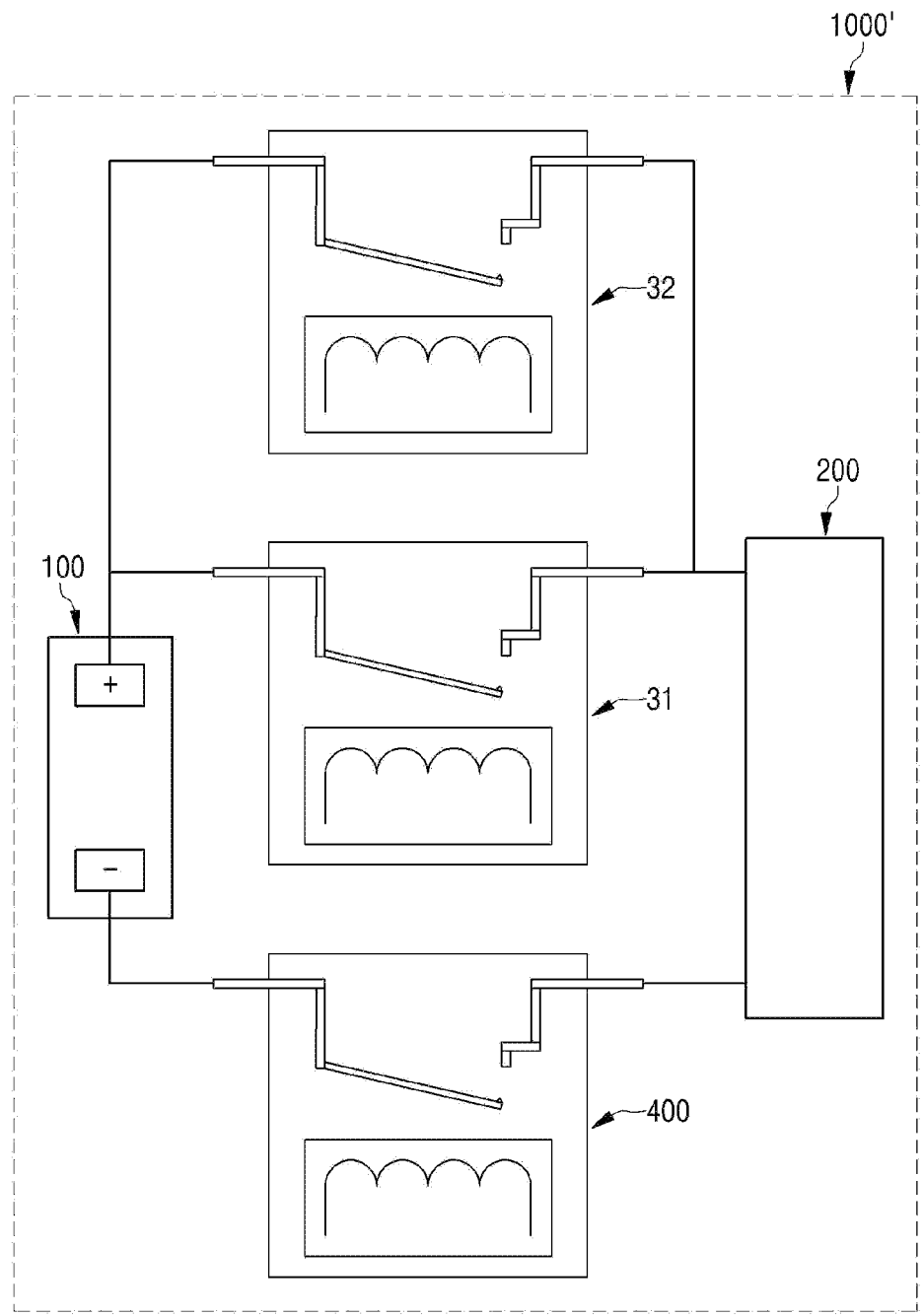
FIG. 6 is a schematic diagram of a relay assembly according to a comparative example of the present disclosure.

Referring to FIG. 6, relay assemblies 31 and 32 according to the comparative example of the present disclosure have a structure that does not include a plurality of contacts. Accordingly, a plurality of relay assemblies 31 and 32 according to the comparative example of the present disclosure may be provided to supply a pre-charge voltage and a main voltage.

Therefore, in an electric vehicle 1000' according to the comparative example of the present disclosure, a relatively large space has to be used for installation of the relay assembly 31 for supplying the pre-charge voltage, the relay assembly 32 for supplying the main voltage, and the main relay 40, and as a consequence, the circuit structure between the battery 100 and the inverter 200 may be complicated.

On the other hand, referring to FIG. 1, the relay assembly 300 according to the exemplary embodiment of the present disclosure has a structure including a plurality of contacts 314 and 315 rotated in conjunction by the magnetic force and controlled to be connected and disconnected with the degree of rotation, and thus it is sufficient that one relay assembly 300 is provided.

Accordingly, in the electric vehicle 1000 according to the exemplary embodiment of the present disclosure, a relatively narrow space is used since one relay assembly 300 and the main relay 400 are installed, and a circuit structure between the battery 100 and the inverter 200 may be relatively simple.

The above exemplary embodiments of the present disclosure are for description of the present disclosure, not for limiting the present description. It should be noted that the configurations and methods disclosed in the above exemplary embodiments of the present disclosure may be combined and modified in various forms by combining or crossing each other, and modifications thereof may also be considered to fall within the scope of the present disclosure. That is, the present disclosure will be implemented in a variety of different forms within the scope of the claims and equivalents thereof, and those skilled in the art to which the present disclosure pertains will understand that various exemplary embodiments are possible within the scope of the technical spirit of the present disclosure.

REFERENCE SIGNS

100: battery, 200: inverter, 300: relay assembly, 310: switching unit, 311: battery connection terminal, 312: inverter connection terminal, 313: lever, 314: main contact bar, 315: pre-charge contact bar, 316: contact bar, 317: spacer, 320: electromagnet unit.

What is claimed is:

1. A relay assembly for connecting an inverter of a device driven by a battery as a power source to the battery, the relay assembly comprising:
   a switching unit configured to connect or disconnect the battery and the inverter, and
   an electromagnet unit installed to operate the switching unit, the electromagnet unit being configured to rotate a plurality of contacts of the switching unit by magnetic force, and the plurality of contacts are configured to be connected and disconnected based on a degree of rotation by the electromagnet unit,
   wherein the switching unit comprises
      a battery connection terminal connected to the battery;
      an inverter connection terminal connected to the inverter;
      a lever extending in a first direction from a portion of the battery connection terminal;
      a main contact bar connected to a portion of the lever and extending obliquely in a second direction intersecting the first direction;
      a pre-charge contact bar connected apart from the portion of the lever, extending obliquely in the second direction, and including a contact resistor, and
      a contact bar extending from a portion of the inverter connection terminal to come into contact with the main contact bar and the pre-charge contact bar.

2. The relay assembly of claim 1, wherein the main contact bar and the pre-charge contact bar are spaced apart from each other by a predetermined distance, and are arranged so that when the electromagnet unit is operated, the pre-charge contact bar is first connected to the contact bar to form an electric power path and then the main contact bar is connected to the contact bar to form an electric power path.

3. The relay assembly of claim 2, wherein at least a portion of each of the main contact bar and the pre-charge contact bar includes a magnetic member,
   the electromagnet unit includes a coil for forming a same polarity as that of the magnetic member in a direction toward the main contact bar and the pre-charge contact bar, and
   a first end of each of the main contact bar and the pre-charge contact bar is rotatably connected to the lever so that as a second end opposite to the first end connected to the lever is rotated in one direction around the first end connected to the lever by a repulsive force applied from the electromagnet unit and the second end comes into contact with contact bar.

4. The relay assembly of claim 1, wherein the switching unit further comprises a spacer containing a non-conductive material and disposed between the main contact bar and the pre-charge contact bar to maintain an interval between the main contact bar and the pre-charge contact bar.

5. The relay assembly of claim 1, wherein the contact bar comprises:
   a first member having an upper end connected to the inverter connection terminal, and extending in the first direction;
   a second member extending in a third direction from a lower end of the first member so that one end of the second member comes into contact with the pre-charge contact bar; and
   a third member extending in the first direction from the second member so that one side of the third member comes into contact with the pre-charge contact bar and a lower end of the third member comes into contact with the main contact bar.

6. The relay assembly of claim 5, wherein an extension length of the main contact bar in the second direction is longer than a separation distance between the lever and the one side of the third member, and shorter than a separation distance between the lever and another side of the third member.

7. The relay assembly of claim 5, wherein an extension length of the pre-charge contact bar in the second direction is equal to a separation distance between the lever and the one side of the third member.

8. An electric vehicle comprising:
   the battery;
   the inverter for supplying electric power from the battery to an electric motor; and
   the relay assembly of claim 1 for supplying and cutting off electric power from the battery to the inverter.

9. The relay assembly of claim 1, wherein the main contact bar and the pre-charge contact bar are parallel to each other.

10. The relay assembly of claim 1, wherein the main contact bar includes a main contact protruding from an upper surface of the main contact bar, and
    wherein the pre-charge contact bar includes a pre-charge contact protruding from a side surface of the pre-charge contact bar.

11. The relay assembly of claim 1, wherein the switching unit is configured so that, in a first state, neither the pre-charge contact bar or the main contact bar contacts the inverter connection terminal.

12. The relay assembly of claim 11, wherein the switching unit is configured so that, in a second state, the pre-charge contact bar contacts the inverter connection terminal and the and the main contact bar does not contact the inverter connection terminal.

13. The relay assembly of claim 12, wherein the switching unit is configured so that, in a third state, both the pre-charge contact bar and the main contact bar contact the inverter connection terminal.

14. The relay assembly of claim 13, wherein the switching unit is configured so that, in a fourth state, the main contact bar contacts the inverter connection terminal and the pre-charge contact bar does not contact the inverter connection terminal.

15. The relay assembly of claim 1, wherein the pre-charge contact bar is located above the main contact bar, and
    wherein the pre-charge contact bar and the main contact bar are located above the electromagnet unit.

* * * * *